(12) United States Patent
Qadir et al.

(10) Patent No.: US 11,421,920 B2
(45) Date of Patent: Aug. 23, 2022

(54) SOLAR-POWERED ADSORPTION CHILLER OPERABLE IN THE ABSENCE OF SUNLIGHT

(71) Applicant: KING FAHD UNIVERSITY OF PETROLEUM AND MINERALS, Dhahran (SA)

(72) Inventors: Najam Ul Qadir, Dhahran (SA); Syed Ahmed M. Said, Dhahran (SA); Rached Ben Mansour, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 52 days.

(21) Appl. No.: 16/394,539

(22) Filed: Apr. 25, 2019

(65) Prior Publication Data

US 2020/0340717 A1 Oct. 29, 2020

(51) Int. Cl.
| | |
|---|---|
| *F25B 27/00* | (2006.01) |
| *H02S 40/32* | (2014.01) |
| *H02S 40/44* | (2014.01) |

(52) U.S. Cl.
CPC ............ *F25B 27/007* (2013.01); *H02S 40/32* (2014.12); *H02S 40/44* (2014.12)

(58) Field of Classification Search
CPC ........ F25B 27/002; Y02E 10/60; Y02E 10/50; Y02B 10/20; F24H 9/2021; F24D 2200/14; F24D 2200/02; F24D 11/003; F24D 17/0068
See application file for complete search history.

(56) References Cited

U.S. PATENT DOCUMENTS

| | | | |
|---|---|---|---|
| 3,281,666 A * | 10/1966 | Makino | G01B 7/105 73/78 |
| 3,661,200 A | 5/1972 | McNamara | |
| 4,307,575 A | 12/1981 | Popinski | |
| 5,293,447 A | 3/1994 | Fanney et al. | |
| 6,253,563 B1 | 7/2001 | Ewert et al. | |
| 6,321,552 B1 | 11/2001 | Frederiksen | |

(Continued)

FOREIGN PATENT DOCUMENTS

| | | |
|---|---|---|
| CN | 102338484 A | 2/2012 |
| CN | 102095260 B | 9/2012 |

(Continued)

OTHER PUBLICATIONS

Francesco Calise, et al., "A novel polygeneration system integrating photovoltaic/thermal collectors, solar assisted heat pump, adsorption chiller and electrical energy storage: Dynamic and energy-economic analysis", Energy Conversion and Management, vol. 149, Oct. 1, 2017, pp. 798-814 (Abstract only).

*Primary Examiner* — Ana M Vazquez
(74) *Attorney, Agent, or Firm* — Oblon, McClelland, Maier & Neustadt, L.L.P.

(57) ABSTRACT

A solar-powered two-bed adsorption chiller which can operate after sunset when the solar radiation intensity becomes zero. Rechargeable solar-powered batteries (SPBs) are connected to a flat-plate solar collector (FPSC). The photoelectric charges are directed from FPSC to a solar charge controller (SCC) which acts as a charge amplifier thus magnifying the total charge before it is finally collected inside the SPB for future use. The SPB is in turn connected to a resistance heating wire (RHW) which is immersed inside the HWST.

7 Claims, 2 Drawing Sheets

(56) References Cited

U.S. PATENT DOCUMENTS

2008/0302357 A1    12/2008  DeNault
2009/0152947 A1*  6/2009  Wang ........................ H02J 4/00
                                                             307/18

FOREIGN PATENT DOCUMENTS

| CN | 102721183 A | 10/2012 | | |
|----|-------------|---------|---|---|
| CN | 202627068 U | 12/2012 | | |
| CN | 205026967 U | 2/2016 | | |
| CN | 205505485 U | 8/2016 | | |
| CN | 205553862 U | 9/2016 | | |
| CN | 208765044 U | * | 4/2019 | ............ F24D 15/02 |
| EP | 1 936 300 A1 | 6/2008 | | |
| EP | 2 169 331 A2 | 3/2010 | | |
| EP | 2 169 331 A3 | 3/2010 | | |

\* cited by examiner

SOLAR-POWERED ADSORPTION CHILLER OPERABLE IN THE ABSENCE OF SUNLIGHT

BACKGROUND

Field of the Invention

The present disclosure relates to solar powered adsorption chillers. In particular a solar-powered two-bed adsorption chiller with operation in the absence of sunlight after sunset.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Despite the progress in vapor compression refrigeration systems, demands for electrical power generation worldwide are constantly on the rise due to consistent depletion of natural resources like coal and natural gas. Hence, the notion of effective utilization of solar energy for refrigeration and air-conditioning purposes is becoming increasingly popular on a global basis. Adsorption refrigeration is one technology that is capable of utilizing incident solar energy on a solar collector for desorption of a vaporized liquid refrigerant from an adsorbent material thereby producing a refrigeration effect in the presence of sunlight. Conventional solar powered adsorption refrigeration systems provide for chiller operation during the daytime, but they do not incorporate a heating source for desorption after the sunset.

Calise et al. ("A novel polygeneration system integrating photovoltaic/thermal collectors, solar assisted heat pump, adsorption chiller and electrical energy storage: Dynamic and energy-economic analysis," *Energy Convers. Manag.*, Vol. 149, 798-814. Mar. 18, 2017. https://www.sciencedirect.com/science/article/pii/S196890417302388) describes the design of an integrated solar thermal/photovoltaic system which is capable of providing space heating and cooling, hot water for domestic use, and electrical energy storage either for assisting in heating/cooling or for supply to the electrical grid. A coupled solar thermal/photovoltaic and electrical energy storage system is proposed which is composed of photovoltaic/thermal collectors, a water storage tank, a reversible solar assisted heat pump, an adsorption chiller, a rechargeable storage battery, and an electric grid. However, this system is unable to operate effectively after sunset and is different from the present invention in which stored electrical energy is utilized to operate an adsorption chiller after sunset. Calise does not utilize a hot water storage tank (HWST) such that the water inside the HWST is heated by the sunlight during daytime, and then heated by resistance heating powered by a solar powered battery (SPB) following sunset, in contrast to the current disclosure. Furthermore, Calise is silent to other features relevant to the utilization of the HWST of the present disclosure.

EP2169331A2 to Sporer et al. discloses an integrated solar collector/solar panel combination where photovoltaic cells are present on the surface of a solar collector for the simultaneous production of thermal energy and electric power for use in adsorption or absorption refrigeration systems. The Sporer collector/panel is composed of two integrated units: (a) photovoltaic cells which are directly on the surface of a solar collector, and (b) a solar heating unit which is comprised of a solar collector with a radiation absorbing material, a light-entry disk, a pipeline for the transfer of thermal energy from the collector to a circulating heat transfer fluid, and a absorption/adsorption refrigeration system operated using electrical and thermal energies. Additionally, Sporer proposes to couple the solar collector and photovoltaic cells so as to maximize the thermal energy conversion of the joint collector. In contrast, the present disclosure describes the storage of electrical energy derived from solar energy as a source of resistance heating to operate an adsorption refrigeration system. Sporer is silent on using a hot water storage tank (HWST) wherein the water inside the HWST is heated by the sunlight during daytime, and then by resistance heating powered by the SPB following sunset. Furthermore, Sporer is silent on the FPSC-SCC-SPB circuit and the SPB-VR-RHW circuit and other aspects of the HWST of the current disclosure.

CN202627068U to Chen et al discloses a solar powered adsorption refrigeration system capable of extracting water vapor from atmospheric air for drinking and other purposes. This solar powered adsorption refrigeration system further comprises a solar panel, a charge controller and a storage battery group composed of solar power supply system. Chen does not describe uninterrupted operation of a solar powered adsorption chiller after sunset. Chen also lacks the utilization of a hot water storage tank (HWST) wherein the water inside the HWST is heated by the sunlight during daytime, and then by resistance heating powered by the SPB following sunset.

CN205553862U Ji et al. discloses an adsorption refrigeration system for use in automobiles in which the heat of exhaust gases is used for refrigerant desorption from a bed, while a cooling fan driven by electrical energy derived from a photovoltaic source is used for condensing a vaporized refrigerant and cooling the bed during the adsorption stage. The proposed design is composed of an adsorbent bed, a condenser, a liquid storage tank, an evaporator, expansion valve, a bulb, a fan motor, a cooling fan, electromagnetic vacuum valve, electromagnetic pipe switch, a solar rechargeable battery, a solar charge controller, an AC/DC inverter, storage battery group, electric thermocouples, and connecting pipelines. Ji does not incorporate any provision of utilizing electricity derived from solar energy as a means to operate the adsorption cooling system in the absence of sunlight. Ji also lacks the utilization of a hot water storage tank (HWST) wherein the water inside the HWST is heated by the sunlight during daytime, and then by resistance heating powered by the SPB following sunset, thus differentiating it from the current disclosure.

CN205026967U to Zhu et al. discloses a solar powered water heater coupled with a photovoltaic (PV) power generation system. The water tank is integrated into the device saving space and, after sunset, a water heating mechanism is powered by solar-charged batteries. Zhu precludes the attachment of a separate hot water storage tank but incorporates it as a part of the assembly. The water circulating inside the unit is heated using a solar collector during the daytime during which the batteries are charged using the PV system. After sunset, the system is shifted from solar powered to battery-powered water heating. Zhu is silent on using a hot water storage tank (HWST) wherein the water inside the HWST is heated by the sunlight during daytime, and then by resistance heating powered by the SPB following sunset.

CN205505485U to Ji et al. (Ji 485) discloses a solar powered continuous adsorption refrigeration and heat supply system in which adsorption heating/cooling technology is coupled with a solar photovoltaic power generation using a monocrystalline silicon solar cell and a semi-conducting refrigeration sheet. During daytime, hot water circulation from the hot water storage tank is used for desorption of water from the bed thus producing a cooling effect, while at the same time the silicon cell storage battery is being charged. At night, hot water circulation is stopped while cold water circulating inside the bed is used to lower its pressure sufficiently low for desorption to take place thereby producing cooling, whereby the heat from cold water is extracted by the refrigerating sheet powered by silicon cell storage battery. Ji 485 is different from the present disclosure because, inter alia, the presently disclosed invention uses solar powered batteries for resistive water heating for desorption purpose instead of powering a refrigerating sheet to extract heat from cold water. Ji 485 is silent on switching to heating the water inside the HWST by resistance heating powered by the SPB following sunset. Furthermore, this reference is silent on the FPSC-SCC-SPB circuit and the SPB-VR-RHW circuit and other aspects of the HWST of the current invention.

The provision of an alternative source of heating power for continual chiller operation after sunset has generally been overlooked in solar-powered adsorption refrigeration systems, and the current invention presents an alternative heat source to heat the water inside the hot water storage tank in the absence of the sunlight.

Accordingly, it is one objective of the present disclosure to describe a solar-powered adsorption chiller/refrigeration system which introduces an alternative source of power for heating the water stored inside a hot water storage tank (HWST) for desorption purposes, where the solar energy that is collected and stored in solar bower batteries during daytime is used to power a resistance heating mechanism to heat the water inside the HWST following the sunset.

SUMMARY OF THE INVENTION

In one aspect the present disclosure provides a solar-powered adsorption chiller system operable in the absence of sunlight.

In another aspect the solar-powered adsorption chiller system includes a solar heating mechanism and a solar powered resistance heating mechanism coupled for use in an adsorption chiller application.

In another aspect the solar-powered adsorption chiller system includes a first circuit having a solar charge controller (SCC) to amplify the photoelectric charges originating from a flat-plate solar collector (FPSC), wherein the SCC magnifies the total charge before it is finally stored inside one or more solar powered battery (SPB) during the daytime; and a second circuit having a resistance heating wire (RHW) electrically connected to the one or more SPBs, wherein the RHW is immersed in a hot water storage tank (HWST) to heat the water stored inside the hot water storage tank, and wherein the RHW uses the solar energy stored in the one or more SPBs to heat the water stored inside the HWST following sunset.

In another aspect the solar-powered adsorption chiller system the second circuit further incorporates a variable resistor (VR) and an ammeter to control the current flowing from the SPBs to the RHW so as to vary the temperature of water stored inside the HWST.

In another aspect the solar-powered adsorption chiller system the first circuit includes a first switch and the second circuit includes a second switch, wherein each switch allows the respective circuit be switched ON or OFF.

In another aspect the solar-powered adsorption chiller system an integrated controller is configured to selectively and automatically control the first switch and the second switch for smooth coupling/de-coupling of the first circuit and the second circuit.

In another aspect the solar-powered adsorption chiller system the first circuit is an FPSC-SCC-SPB circuit connecting the FPSC to the SCC to the SPB, and wherein the second circuit is a SPB-VR-RHW circuit, connecting the one or more SPBs to the VR and to the RHW.

In another aspect the solar-powered adsorption chiller system the integrated controller is configured to selectively and automatically control the first switch and the second switch in order to close the first circuit loop and to open the second circuit during the daytime, and to control the first switch and the second switch to open the first circuit loop and to close the second circuit loop following sunset or when solar radiation intensity is zero or close to zero.

In another aspect the solar-powered adsorption chiller system the integrated controller is configured to control the first switch and the second switch such that the closing/opening of the FPSC-SCC-SPB circuit and the SPB-VR-RHW circuit is smooth, and the SPB-VR-RHW circuit closes nearly immediately following sunset or when solar radiation intensity is zero or close to zero, and for nearly uninterrupted water heating functionality at the HWST.

In another aspect the solar-powered adsorption chiller system includes a plurality of SPBs connected in series.

In another aspect the solar-powered adsorption chiller system includes a DC/AC inverter within the SPB-VR-RHW circuit.

In yet another aspect the present disclosure provides a two-bed solar-powered adsorption chiller with a dual solar heating/resistance heating provision for uninterrupted operation in the absence of sunlight.

In yet another aspect two-bed solar-powered adsorption chiller includes two adsorber/desorber beds, wherein adsorber/desorber beds are equal-sized and are each packed with a granulated adsorbent.

In yet another aspect two-bed solar-powered adsorption chiller includes a plurality of solar-powered batteries.

In yet another aspect two-bed solar-powered adsorption chiller includes an evaporator.

In yet another aspect two-bed solar-powered adsorption chiller includes a condenser.

In yet another aspect two-bed solar-powered adsorption chiller includes a first pair of control valves installed between the evaporator and the adsorber/desorber beds, and a second pair of control valves installed between the condenser and the adsorber/desorber beds to control the flow of a refrigerant.

In yet another aspect two-bed solar-powered adsorption chiller includes a hot water storage tank (HWST).

In yet another aspect two-bed solar-powered adsorption chiller the HWST connected to a flat plate solar collector (FPSC) and is configured to use solar energy collected by the flat plate solar collector during the daytime, wherein the solar energy is channeled to the HWST via connecting tubes.

In yet another aspect two-bed solar-powered adsorption chiller the HWST contains a resistance heating wire (RHW) immersed in the water inside the HWST and is configured to heat the water using the SPBs as a source of electrical power following sunset or when solar radiation intensity is zero or close to zero.

In yet another aspect two-bed solar-powered adsorption chiller the adsorption chiller functions to generate the cooling effect via four sequential operational modes.

In yet another aspect two-bed solar-powered adsorption chiller the two beds function in parallel to facilitate a continuous cooling effect.

In yet another aspect two-bed solar-powered adsorption chiller includes an integrated controller configured to selectively and automatically control a first switch and a second switch for smooth coupling/de-coupling of a first circuit and a second circuit, the second circuit coupling the solar powered batteries to the resistance heating wire (RHW) immersed in the water inside the HWST.

In yet another aspect two-bed solar-powered adsorption chiller the first circuit comprises a solar charge controller coupled to the solar powered batteries and couples a plurality of photovoltaic panels of the FPSC to the solar charge controller.

In still a further aspect the present disclosure provides a method of heating the water in a hot water storage tank in a two-bed solar-powered adsorption chiller system with a dual solar heating/resistance heating.

In still another aspect the method includes absorbing solar heat energy from the sunlight passed through a solar photovoltaic (PV) panel at a large black surface area of a flat-plate solar collector during the daytime.

In still another aspect the method includes transferring the absorbed solar energy to a fluid piping, where the solar heat energy is absorbed by a collection fluid passing through the fluid piping in a solar thermal device.

In still another aspect the method includes transporting the absorbed and collected solar heat energy, via a fluid line and using at least a flow meter and a pump for controlled flow rate circulation, to a heat exchanger inside the hot water storage tank, and returning the cooled collection fluid back to the solar thermal device via an entry end of the fluid piping.

In still another aspect the method includes generating an electric charge flow from the sunlight solar energy received at the solar PV panel system during the daylight.

In still another aspect the method includes passing the electric charge flow to a solar charge controller, and magnifying the electric charge flow at a fixed value voltage.

In still another aspect the method includes storing the solar energy from sunlight in a solar powered battery system by charging one or more solar powered batteries with the magnified electric charge flow at the fixed value voltage.

In still another aspect the method includes switching ON a first circuit loop by closing a first switch during the daytime and while keeping a second circuit loop switched OFF by keeping a second switch open, wherein the first circuit loop includes the PV panel system, the solar charge controller, and the solar powered battery system.

In still another aspect the method includes using the charged solar powered batteries to heat the following sunset or when solar radiation intensity is zero or close to zero In still another aspect the method includes switching OFF the first circuit loop by opening the first switch following sunset or when solar radiation intensity is zero or close to zero, and immediately thereafter switching ON the second circuit loop by closing the second switch, wherein the second circuit loop the solar powered batteries, a resistance heating wire immersed in the water in the hot water storage tank, a variable resistor and an ammeter.

In still another aspect the method includes using an integrated controller of the solar charge controller to selectively and automatically closing/opening the first switch and the second switch for smooth coupling/de-coupling of the first circuit and the second circuit, and for nearly uninterrupted water heating functionality at the hot water storage tank of the two-bed solar-powered adsorption chiller system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1A:
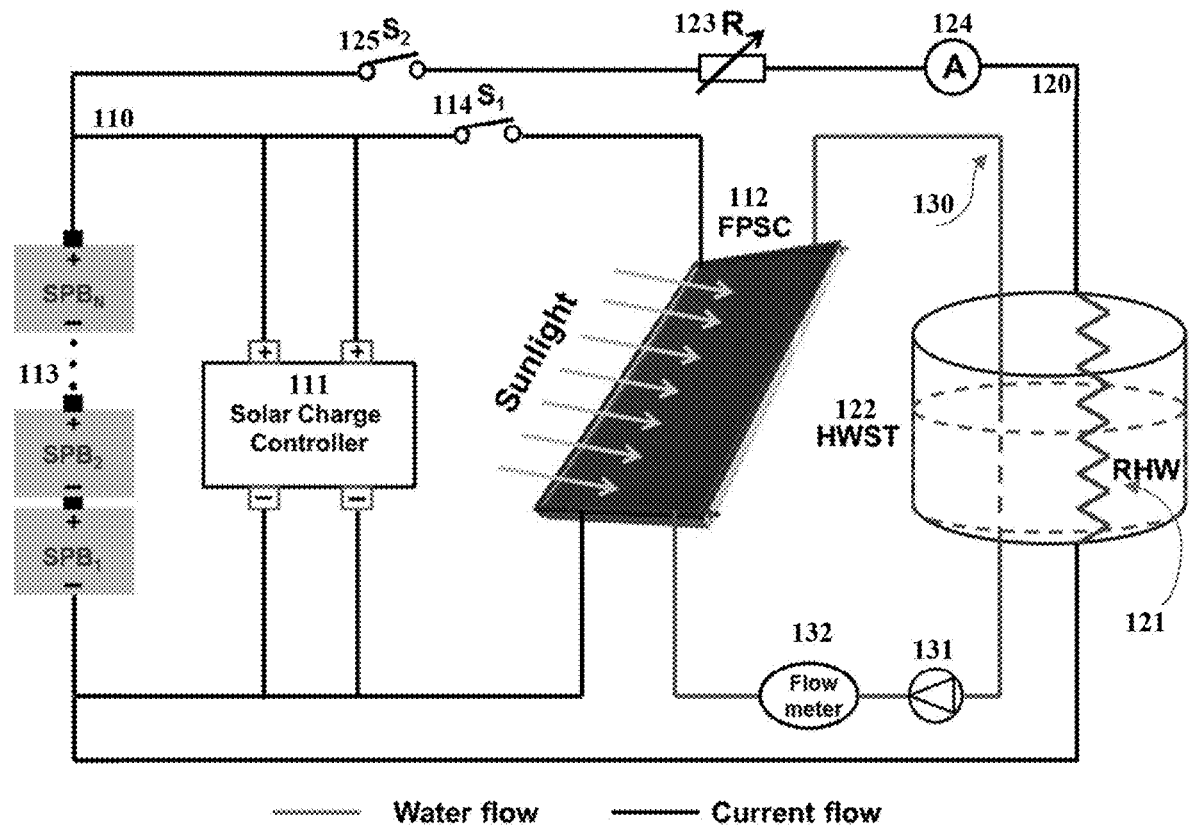
FIG. 1A shows a schematic of two electrical circuits according to the present invention.

Aspects of the present invention will be described hereinbelow in conjunction with the above-described drawings.

The present disclosure includes a method, system and apparatus of a solar-powered two-bed adsorption chiller which is capable of continuous operation after sunset. Rechargeable solar-powered batteries (SPBs) connected to a flat-plate solar collector (FPSC) are charged during daytime using the sunlight incident on the collector during the normal operation of the chiller. To allow the chiller operation to resume after the sunset and during the night, a resistance heating mechanism powered by SPBs via a variable resistor and an ammeter for variable heat input is used. Using the SPBs-powered resistance heating mechanism according to the disclosed invention also maximizes the utilization of solar energy in the solar-based adsorption refrigeration/chiller.

In various embodiments of the system of the present disclosure includes the following components:

Two electrical circuits in conjunction with a solar-powered adsorption chiller.

A first circuit (FPSC-SCC-SPB) incorporating a solar charge controller (SCC) which amplifies the photoelectric charges originating from a flat-plate solar collector (FPSC) to the solar charge controller which acts as a charge amplifier magnifying the total charge before it is finally stored inside a solar powered battery (SPB) during the daytime.

The solar charge controller acts as an electronic voltage regulator that controls the flow of power from the FPSC to the SPBs. It automatically tapers, stops, or diverts the charge when the SPBs become fully charged. The solar charge controller also helps in charging deep cycle SPBs and also prevents the SPBs from being overcharged by the FPSC which can reduce battery performance or lifespan, and might also occasionally pose a safety risk. It may also prevent completely draining ("deep discharging") the SPBs, or perform controlled discharges as well as reverse the current flow during the night time. Solar charge controllers are classified as either Pulse Width Modulation (PWM) or Maximum Power Point Tracking (MPPT). The MPPT design results in significantly lower power losses than the PWM-type SCCs. Lower voltage in the wires running from the FPSC to the SCC results in higher energy loss in the wires than higher voltage. With a PWM-type SCC used with 12 V batteries, the voltage from the FPSC to the SCC typically has to be 18 V. Using an MPPT-type controller allows much higher voltages in the cables from the FPSC to the SCC. The MPPT-type controller then converts the excess voltage into additional amperes. By running higher voltage in the cables from the FPSC to the SCC, power loss in the cable is reduced significantly. In this context, a MPPT-type SCC is also proposed in the current study.

- A second circuit (SPB-VR-RHW) that includes a resistance heating wire (RHW) powered by the SPB for heating the water stored inside a hot water storage tank (HWST) after sunset.
- A variable resistor (VR) and an ammeter within the second circuit for controlling the magnitude of the current flowing from the SPB to RHW in order to vary the temperature of the water stored inside the HWST in accordance with the user requirement.
- Switches for (i) switching the FPSC-SCC-SPB circuit on, during the daytime when the sunlight is available, to charge the SPB using solar energy while the SPB-VR-RHW circuit is switched off since the sunlight itself is used to heat the water stored inside the HWST, and (ii) switching the FPSC-SCC-SPB circuit off following the sunset while the SPB-VR-RHW circuit is switched on and the resistance heating powered by the SPB is used to heat the water stored inside the HWST.
- A plurality of SPBs connected in series so as to improve the intensity of the resistance heating using the SPB-VR-RHW circuit in case a relatively higher desorption temperature is required.
- An optional DC/AC inverter inserted within the SPB-VR-RHW circuit for converting the DC current flowing from the SPBs into AC current.

In contrast to conventional designs the solar-powered two-bed adsorption chiller of the present disclosure provides uninterrupted operation (cooling) after sunset and/or at times when solar radiation intensity is zero or close to zero. The disclosed invention maximizes the use of solar energy and can be a basis for the development of uninterrupted commercial-scale solar-powered adsorption chillers capable of yielding a high coefficient of performance.

Various components of the present invention include rechargeable solar-powered batteries (SPBs) connected to a flat-plate solar collector, a solar charge controller for charge amplification, and a resistance heating mechanism powered by SPBs via a variable resistor and an ammeter for variable heat input. The SPBs are charged during daytime using the sunlight incident on the collector during the normal operation of the chiller. During the night time, the chiller operation resumes by using stored energy in the SPBs for desorption purpose.

According to one embodiment of the invention, a solar heating mechanism and a solar powered resistance heating mechanism are coupled for use in adsorption chiller applications. FIG. 1A is a schematic illustration of two electrical circuits used for coupling of the solar heating mechanism and the solar-powered resistance heating mechanism.

Figure 1B:
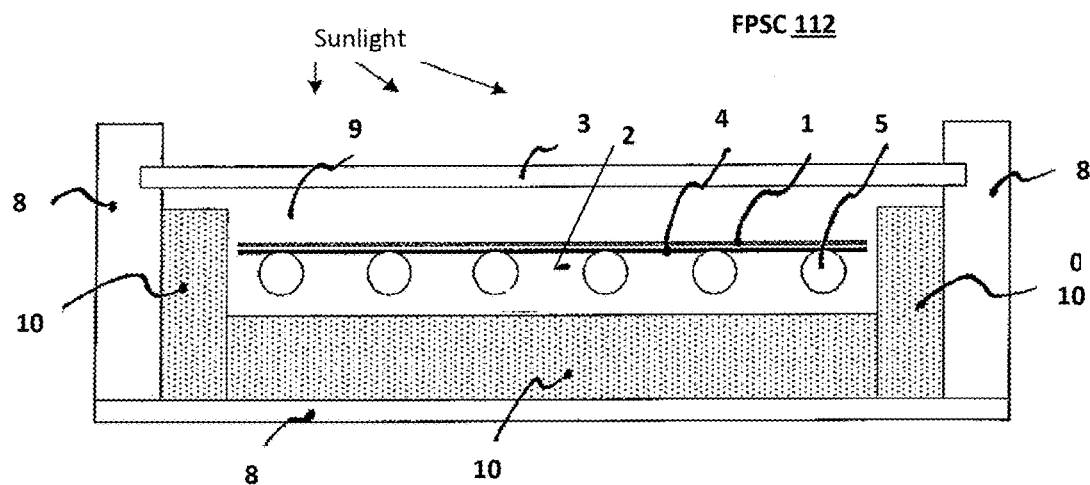
FIG. 1B is a schematically illustrated side sectional view of a flat-plate solar collector according to the present invention

As can be seen in FIG. 1A, the first circuit 110 incorporates a solar charge controller (SCC) 111 and a switch 114. With switch 114 closed during daytime, photoelectric charge (Direct Current) originating from flat-plate solar collector (FPSC) 112 passes through circuit 110 and is finally stored inside one or more solar powered battery (SPB) 113. An exemplary structure of FPSC 112 includes a single and/or multiple photovoltaic (PV) panels that receive the sunlight (i.e., solar energy) and convert it into direct current (DC) flow of electric charge. PV panels are arranged to receive sunlight for longest period during the day. The FPSC 112 also includes a black light absorber layer that collects solar energy from solar radiation (sunlight) and converts it into heat. FIG. 1B is a schematically illustrated side sectional view of the exemplary FPSC 112. It can be seen that the FPSC 112 comprises a planar transparent thin screen 3 (e.g., from an about 4 mm thick glass panel), at least one solar photovoltaic (PV) panel 1 mounted directly under the transparent thin screen 3, a black surface absorber plate 4, a solar thermal device 2, a fluid piping 5, limiters 8, and thermal insulation 10. The solar thermal device 2 comprises the fluid piping 5 that is in direct contact with the black surface absorber plate 4. The sunlight transmitted through an air space 9 is incident on the solar PV panel 1 that converts the sunlight into electricity (i.e. DC current). This electrical current is used to charge SPB battery 113 via circuit 110. Thus, the solar energy is harvested and converted by PV panels and is stored in the battery SPB 113.

Solar PV panels are rated at nominal voltage and power values, but both these values decrease as the panel temperature increases. Furthermore, the maximum power point of the solar panel, too, varies inversely with the temperature of the panel. The solar charge controller SCC 111 regulates these changes and charges SPB 113 at the required constant voltage. An exemplary SCC 111 of the present disclosure comprises a microprocessor-based controller coupled to a memory system, a DC transformer, a voltage sensor and a current sensor coupled to the microprocessor-based controller to provide it with instantaneous sensed current and voltage values. The DC current from the solar PV panel 1 is fed to the current and voltage sensors and the DC transformer of SCC 111. An algorithm stored in a read only portion of the memory system tracks the maximum power points from the instantaneous voltage and current values, and generates switching signals. Controlled by the switching signals generated by the algorithm, the DC transformer magnifies/boosts the DC current (i.e. electric charge flow) and regulates the voltage at a fixed value for charging SPB 113. More specifically, the DC transformer transforms the input power from a higher voltage to the output power at a lower voltage. The actual magnitude of the input power does not change (except for a small loss in the transformation process). Therefore, if the output voltage is lower than the input voltage, the output current will be higher than the input current. The described boosting/magnifying functionality provides for full utilization of electrical power (i.e. harvested solar energy) available from the solar PV panels 1 in charging the battery SPB 113.

Referring back to the schematic side sectional view of the exemplary FPSC 112 illustrated in FIG. 1B, the black surface plate 4 provides a large surface area to absorb solar energy from the sunlight that passes through solar PV panel 1. The absorbed solar energy [heat] is transferred to the fluid piping 5, where the heat energy is absorbed by a collection fluid passing through piping 5. As can be seen in FIG. 1B, the collection fluid exits the FPSC 112 (via an exit end of piping 5) and transports the absorbed/collected heat to a heat exchanger (not shown) inside the hot water storage tank HWST 122 that heats the water inside the HWST 122. After passing through the heat exchanger, the cooled collection fluid returns to solar thermal device 2 (via an entry end of piping 5) of the FPSC 112. The flow line 130 shows the closed-loop path of the heat collection liquid. A pump 131 and a flow meter 132 are used for circulating the heat collection liquid, at a controlled flow rate, from the FPSC 112 to the heat exchanger inside the HWTS 122 and back to FPSC 112 (see FIG. 1A). The heat exchanger is made of a very high heat exchange rate material. In some embodiments the heat exchanger is a coil inside the HWST 122. Alternatively, the heat exchanger is a flat plate exchanger. Any liquid with high heat absorption rate can be used as heat collection fluid. According to one embodiment, the collection fluid is water. In some alternative embodiments the heat collection fluid is an antifreeze solution.

According to various embodiments of the present invention, the hot water storage tank HWST 122 incorporates a second heating mechanism, a resistance heating wire (RHW) which is immersed inside the HWST. As described above, the harvested solar energy during daytime is stored in SPB batteries, and is selectively used to heat the water inside the hot water storage tank with a resistance heating mechanism after sunset and/or when the sunlight is zero or near zero.

As illustrated schematically in FIG. 1A, the second circuit 120 incorporates a switch ($S_2$) 125, that when closed, connects battery SPB 113 to the resistance heating wire (RHW) 121 inside the hot water storage tank HWST 122. A variable resistor (VR) 123 and an ammeter 124 are also incorporated within circuit 120 in order to monitor the magnitude of the DC current flowing from the SPBs 113 to the RHW 121 so as to vary the temperature of water stored inside the HWST 122 in accordance with the user requirement. Switches $S_1$ 114 and $S_2$ 125 selectively switch on/off the first circuit 110 and the second circuit 120, respectively. During the daytime, when the sunlight is sufficiently available, the FPSC-SCC-SPB circuit 110 is switched on by closing $S_1$ 114, while the SPB-VR-RHW circuit 120 is switched off by opening $S_2$ 125. With this selection of $S_1$ 14 and $S_2$ 125, the solar energy harvested by the PV panel 1 (electrical charge/current) is constantly and continuously stored in the battery PSB 113. After sunset (when sunlight is zero or near zero), switches $S_1$ 114 and $S_2$ 125 are set to open and closed position, respectively. With the FPSC-SCC-SPB circuit 110 switched off and the SPB-VR-RHW circuit 120 switched on, battery PSB 113 is decoupled from the PV panel 1 and coupled to RHW 121, thus supplying the stored electrical energy to the resistance heating mechanism (RHW 121). Switches 125 and 114, variable resistor (VR) 123 and an ammeter 124 are shown as separate components for conceptual illustration. In preferred embodiments, these and any other needed components, and a control circuitry are incorporated in the solar charge controller 111. Alternatively, in other preferred embodiments, switches 114 and 125, VR 123, ammeter 124 and other elements (as needed), and the control circuitry are integrated in a dedicated control unit. In some embodiments, the dedicated control circuitry is implemented in a single integrated circuit (IC) chip, and has I/O ports for receiving user input data, control parameters and control signals, and for outputting appropriate control signals.

In preferred embodiments, elements VR 123, ammeter 124, switches 114 and other similar components are incorporated in SCC 111, I/O ports are provided for receiving user input data, control parameters and control signals, and for outputting appropriate control signals, and the corresponding control functionalities are implemented with an algorithm stored in a control read only memory. In some embodiments, the control read only memory is a portion of the memory system of the microprocessor-based controller. Yet in some other embodiments, the control read only memory is not a portion of the memory system of the microprocessor-based controller. In the embodiments described above, selective switching of circuits 110 and 120 (closing/opening of switches 114 and 125) is done automatically by any of the controllers disclosed above. This provides for smooth coupling/de-coupling of circuits 110 and 120, and as such, the resistance heating mechanism is immediately available and powered by battery PSB 113, providing uninterrupted water heating functionality.

An optional DC/AC inverter (not shown) can also be inserted within the SPB-VR-RHW circuit 120 for converting the DC current flowing from the SPB into AC current.

Another embodiment of the present invention includes a two-bed solar-powered adsorption chiller with a dual solar heating/resistance heating provision for uninterrupted operation following the sunset.

Figure 2:
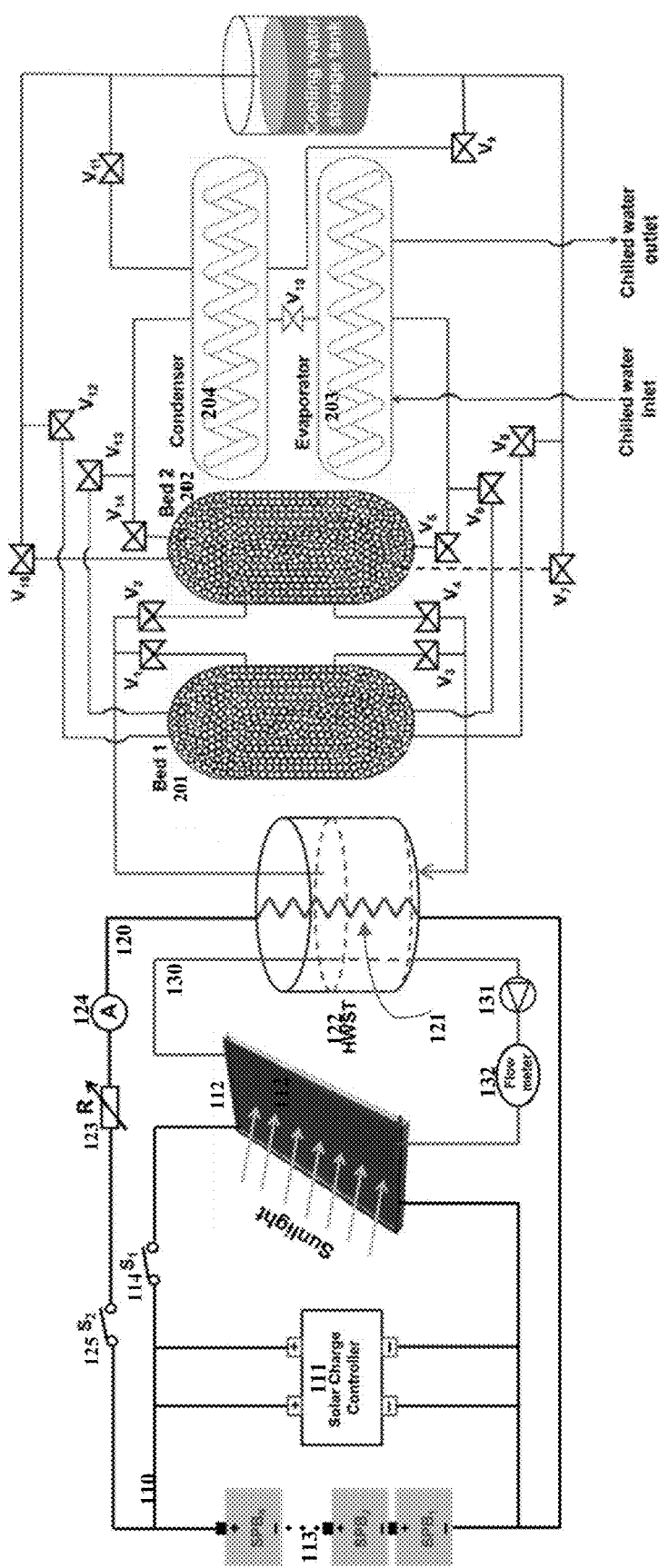
FIG. 2 presents a schematic of a two-bed solar powered adsorption chiller in accordance with the present invention.

FIG. 2 is a schematically illustrates a two-bed solar adsorption chiller which integrates the solar-energy-powered resistance heating concept of the embodiment of FIGS. 1A and B for uninterrupted chiller operation after sunset.

As can be seen in FIG. 2, a two-bed adsorption chiller includes of four components, namely two beds 201 and 202 (adsorber or desorber based on operational mode), evaporator 203 and condenser 204. The two beds are generally equal-sized and are packed with the granulated adsorbent. A pair of control valves, $V_2$ and $V_4$, is installed between the evaporator 203 and the adsorption/desorption beds, and another pair of control valves, $V_1$ and $V_3$, between the condenser 204 and the beds to monitor the flow of the refrigerant. During daytime, the water stored inside the HWST 122 is heated using solar energy which is collected by the flat plate solar collector 112 and is channeled to the HWST 122 via connecting tubes. At the same time, the solar-powered batteries 113 which are connected in series are also charged using sunlight incident upon the collector 112. Following sunset, the water stored inside the HWST 122 is heated via a resistance heating wire 121 which is immersed inside the water in HWST and is heated using the SPBs as the source of electrical power. The adsorption chiller functions to generate the cooling effect via four sequential operational modes. In the first mode, $V_1$ and $V_4$ are kept closed while $V_1$ and $V_3$ are kept open. The refrigerant vaporizes at the current evaporator temperature and pressure, and is directed towards the adsorption bed where cold water circulation absorbs the heat generated during the adsorption process. At the same time, the hot water circulation around the desorption bed desorbs the already adsorbed refrigerant with the desorbed vapors directed towards the condenser via $V_3$. The refrigerant vapor is condensed again via cold water circulation within the condenser, while the liquid refrigerant then flows back to the evaporator which ends the first mode. In the second mode, $V_1$-$V_4$ are kept closed and the adsorption and desorption beds are pre-heated and pre-cooled via hot water and cold water circulation respectively, till the pressures inside the adsorption and desorption beds become roughly equal to the condenser and evaporator pressure respectively. The third mode is the reciprocal of the first one since the adsorption bed in the first one now functions as the desorption bed, and vice versa. As a consequence, the fourth mode is also the reciprocal of the second one, following which the first mode is re-visited. Hence, the presence of two beds functioning in parallel facilitates a continuous cooling effect as opposed to a one-bed adsorption chiller in which a single bed can either adsorb or desorb at a time, and the cooling effect can only be generated during the desorption phase.

In the present disclosure, a two-bed solar-powered adsorption chiller has been described which uses solar-energy-powered resistance heating as an alternative thermal source as a supplement to the solar energy which is not available following sunset. One object of the invention is to achieve uninterrupted operation of the adsorption chiller following sunset which is not possible with conventional adsorption/desorption designs. The concepts, designs, method, system, and apparatus of the present disclosure are distinguished from conventional systems which use solar energy as the only available thermal source without the provision of an alternative source for chiller operation following sunset.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A solar-powered adsorption chiller system operable in the absence of sunlight, comprising:
   a solar heating mechanism and a solar powered resistance heating mechanism coupled for use in an adsorption chiller application;
   a first circuit having a solar charge controller (SCC) to amplify the photoelectric charges originating from a flat-plate solar collector (FPSC), wherein the SCC magnifies the total charge before it is finally stored inside one or more solar powered battery (SPB) during the daytime; and
   a second circuit having a resistance heating wire (RHW) electrically connected to the one or more SPBs, wherein the RHW is immersed in a hot water storage tank (HWST) to heat water stored inside the hot water storage tank, and wherein the RHW uses the solar energy stored in the one or more SPBs to heat the water stored inside the HWST following sunset;
   wherein the first circuit includes a first switch and the second circuit includes a second switch, wherein each switch allows the respective circuit be switched ON or OFF; and
   wherein an integrated controller is configured to selectively and automatically control the first switch and the second switch for smooth coupling/de-coupling of the first circuit and the second circuit.

2. The solar-powered adsorption chiller system of claim 1, wherein the second circuit further incorporates a variable resistor (VR) and an ammeter to control the current flowing from the SPBs to the RHW so as to vary the temperature of water stored inside the HWST.

3. The solar-powered adsorption chiller system of claim 1, wherein the first circuit is an FPSC-SCC-SPB circuit connecting the FPSC to the SCC and to the SPB, and wherein the second circuit is a SPB-VR-RHW circuit, connecting the one or more SPBs to the VR and to the RHW.

4. The solar-powered adsorption chiller system of claim 3, wherein the integrated controller is configured to selectively and automatically control the first switch and the second switch in order to close the first circuit and to open the second circuit during the daytime, and to control the first switch and the second switch to open the first circuit and to close the second circuit loop following sunset or when solar radiation intensity is zero or close to zero.

5. The solar-powered adsorption chiller system of claim 4, wherein the integrated controller is configured to control the first switch and the second switch such that the closing/opening of the FPSC-SCC-SPB circuit and the SPB-VR-RHW circuit is smooth, and the SPB-VR-RHW circuit closes nearly immediately following sunset or when solar radiation intensity is zero or close to zero, and for nearly uninterrupted water heating functionality at the HWST.

6. The solar-powered adsorption chiller system of claim 5, comprising a plurality of SPBs connected in series.

7. The solar-powered adsorption chiller system of claim 5, comprising a DC/AC inverter within the SPB-VR-RHW circuit.

* * * * *